United States Patent
Falta et al.

(10) Patent No.: US 9,105,888 B2
(45) Date of Patent: Aug. 11, 2015

(54) ANODE PURGE AND DRAIN VALVE STRATEGY FOR FUEL CELL SYSTEM

(75) Inventors: Steven R. Falta, Honeoye Falls, NY (US); Matthew A. Lang, Churchville, NY (US); Daniel C. Di Fiore, Scottsburg, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 377 days.

(21) Appl. No.: 13/268,043

(22) Filed: Oct. 7, 2011

(65) Prior Publication Data

US 2013/0089797 A1   Apr. 11, 2013

(51) Int. Cl.
*H01M 8/06* (2006.01)
*H01M 8/04* (2006.01)
*H01M 8/10* (2006.01)

(52) U.S. Cl.
CPC ...... *H01M 8/04097* (2013.01); *H01M 8/04164* (2013.01); *H01M 8/04179* (2013.01); *H01M 8/04231* (2013.01); *H01M 8/04402* (2013.01); *H01M 8/04492* (2013.01); *H01M 8/04514* (2013.01); *H01M 8/04761* (2013.01); *H01M 8/04776* (2013.01); *H01M 8/04843* (2013.01); *H01M 8/04992* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

| 2003/0110841 | A1* | 6/2003 | Zhang et al. | 73/61.76 |
| 2007/0196709 | A1* | 8/2007 | Umayahara et al. | 429/25 |
| 2008/0213635 | A1* | 9/2008 | Blaszczyk et al. | 429/14 |
| 2008/0311442 | A1 | 12/2008 | Sienkowski et al. | |
| 2011/0087441 | A1 | 4/2011 | Salvador et al. | |
| 2011/0207012 | A1* | 8/2011 | Frost et al. | 429/450 |

FOREIGN PATENT DOCUMENTS

| CN | 1934740 A | 3/2007 |
| CN | 102163728 A | 8/2011 |

* cited by examiner

*Primary Examiner* — Ula C Ruddock
*Assistant Examiner* — Matthew Van Oudenaren
(74) *Attorney, Agent, or Firm* — Fraser Clemens Martin & Miller LLC; James D. Miller

(57) ABSTRACT

A combined water drain and diluent gas purge valve routes fluid from the anode side of a fuel cell to the cathode inlet. When a purge of diluent gas is requested, the valve opens, draining any liquid present in the sump of a water separation device, for example. After the liquid has drained, the diluent gas is purged. An anode bleed model using fuel injector feedback can determine the amount of gas exiting the valve, and can request the valve to close once the required amount of diluent is purged. During operation, an amount of hydrogen may exit the valve. Hydrogen passing through the valve can be catalytically consumed once it reaches the cathode electrode, causing the cathode exhaust, and the fuel cell exhaust to have a reduced hydrogen content.

17 Claims, 1 Drawing Sheet

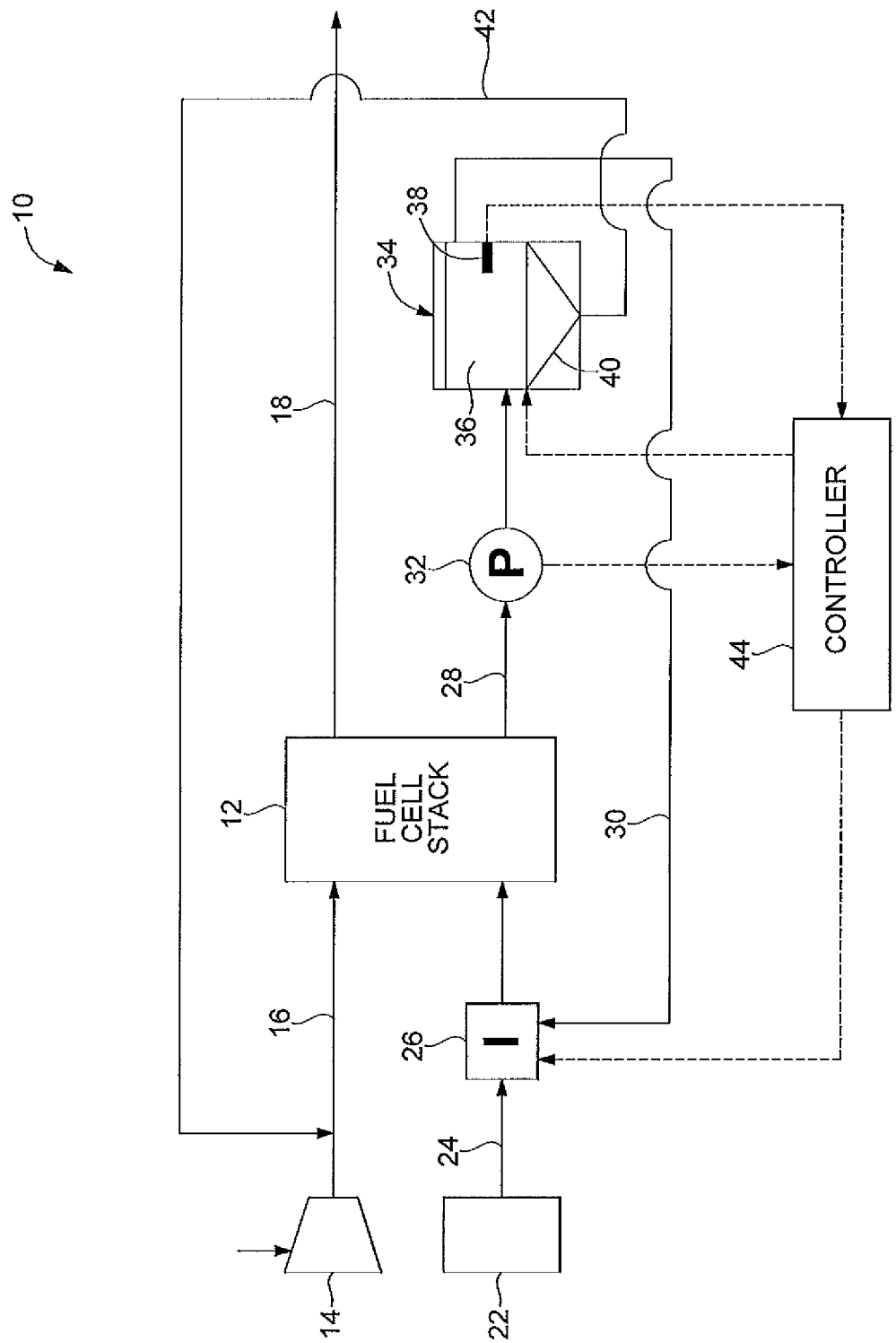

ANODE PURGE AND DRAIN VALVE STRATEGY FOR FUEL CELL SYSTEM

FIELD OF THE INVENTION

The present technology relates to systems and methods that include combined removal of a diluent gas and water from an anode of a fuel cell.

BACKGROUND OF THE INVENTION

This section provides background information related to the present disclosure which is not necessarily prior art.

Hydrogen is an attractive fuel as it can provide low emissions and can be used to efficiently produce electricity in a fuel cell. A hydrogen fuel cell is an electrochemical device having an anode and a cathode separated by an electrolyte. The anode receives a fuel such as hydrogen gas and the cathode receives an oxidant such as oxygen or air. Hydrogen gas is dissociated in the anode to generate free protons and electrons, where the protons pass through the electrolyte to the cathode. The electrons from the anode do not pass through the electrolyte, but are instead directed through a load to perform work before being directed to the cathode. In the cathode, the protons, electrons, and oxygen react and generate water.

Proton exchange membrane (PEM) fuel cells are a type of fuel cell used to power vehicles. The PEM fuel cell generally includes a solid polymer-electrolyte proton-conducting membrane, such as a perfluorosulfonic acid membrane. The anode and cathode can include a catalytic mixture of finely divided catalytic particles, such as platinum (Pt), supported on carbon particles and mixed with an ionomer. The catalytic mixture can be deposited on opposing sides of the membrane. Combination of the anode catalytic mixture, the cathode catalytic mixture, and the membrane can be referred to as a membrane electrode assembly (MEA).

Several fuel cells can be combined into one or more fuel cell stacks to generate the desired power. For certain applications, a fuel cell stack may include several hundred or more fuel cells. The fuel cell stack receives a cathode reactant gas, typically a flow of air forced through the stack by a compressor. Not all of the oxygen may be consumed by the stack, and some of the air can be output as a cathode exhaust gas that can include water as a stack byproduct. The fuel cell stack also receives an anode reactant gas such as hydrogen that flows into the anode side of the stack.

A fuel cell stack can include a series of bipolar plates positioned between several MEAs within the stack, where the bipolar plates and the MEAs are positioned between two end plates. The bipolar plates include an anode side and a cathode side for adjacent fuel cells in the stack. Anode gas flow channels are provided on the anode side of the bipolar plates to allow the anode reactant gas to flow to the respective MEA. Cathode gas flow channels are provided on the cathode side of the bipolar plates to allow the cathode reactant gas to flow to the respective MEA. One end plate includes anode gas flow channels and the other end plate includes cathode gas flow channels. The bipolar plates and end plates are made of a conductive material such as stainless steel or a conductive composite. The end plates conduct the electricity generated by the fuel cells out of the stack. The bipolar plates can also include coolant flow channels, through which a cooling fluid flows to control the temperature of the fuel cell.

Stack order switching or flow shifting can be used in a fuel cell system that employs split stacks. Particularly, suitable valves and plumbing in the system can be provided so that the anode exhaust gas exiting a first sub-stack is sent to the anode inlet of a second sub-stack, and the anode exhaust gas exiting the second sub-stack is sent to the anode inlet of the first sub-stack in a cyclical manner.

Distribution of hydrogen within the anode flow channels of the fuel cell stack can be kept substantially constant during fuel cell stack operation. To this end, more hydrogen is directed into the fuel cell stack than is necessary for a certain output load of the stack so that the anode gas is evenly distributed. However, the anode exhaust gas can subsequently include a significant amount of hydrogen gas that can reduce system efficiency if the hydrogen is simply discarded. The anode exhaust gas can therefore be recirculated back to the anode input to reuse the hydrogen.

MEAs are permeable and therefore allow nitrogen and other gases present in air on the cathode side of the fuel cell stack to permeate therethrough and collect in the anode side of the fuel cell stack. This is referred to as crossover. Even though the anode side pressure may be slightly higher than the cathode side pressure, cathode side partial pressures can cause gases within air to permeate through the membrane. For example, nitrogen entering the anode side of the fuel cell stack consequently dilutes the hydrogen fuel gas, and if the nitrogen concentration increases above a certain percentage, such as 50%, operation of the fuel cell stack can be affected. A bleed valve can be provided in an anode recirculation loop or the anode exhaust of the fuel cell stack to purge nitrogen and other diluent gases from the anode side of the stack, where they can be directed to an exhaust stream, such as the cathode exhaust.

Gas that is periodically bled from the anode recirculation loop or anode exhaust can include a considerable amount of hydrogen. As such, bled recirculation gas can be directed to a combustor to burn most or all the hydrogen therein before the recirculation gas is exhausted to the environment. However, the combustor adds complexity, cost, and weight to the fuel cell system. In some cases, bled recirculation gas can also be directed to the cathode upstream of the fuel cell stack.

Water can also migrate from the cathode side and collect on the anode side of the fuel cell stack, requiring a means to remove water from the anode side. A water separator including a valve located at the bottom of a sump, in conjunction with a liquid water level sensor, can be used to detect and remove liquid water condensate from the anode side where it can be routed to an exhaust stream, such as the cathode exhaust.

Removal of diluent gas and removal of water from the anode side by routing each to an exhaust stream provides a path for the hydrogen fuel gas to enter the exhaust stream, which may present a hydrogen emission concern.

SUMMARY OF THE INVENTION

The present technology includes systems, processes, articles of manufacture, and compositions relating to combined diluent gas and water purge strategies for an anode side of fuel cell.

In some embodiments, a fuel cell system comprises a fuel cell, a water separation device, and a controller. The fuel cell includes a cathode inlet, a cathode outlet, an anode inlet, and an anode outlet. The water separation device is fluidly coupled to the anode outlet and fluidly coupled to the anode inlet via a recirculation loop. The water separation device includes a valve fluidly coupled to the cathode inlet. The controller is configured to operate the valve.

In some embodiments, methods include opening the valve using the controller to drain liquid, to purge gas, or to drain liquid and purge gas to the cathode inlet. In various embodiments, the controller can determine when a fluid passing through the valve transitions from liquid to gas. The controller can also compare a first flow rate through the water separation device and a second flow rate through the injector to determine when the valve transitions from draining liquid to purging gas. The controller can also open the valve at a particular time interval to ensure liquid does not fill or overwhelm the water separation device, for example where the water separation device does not include a water level indicator.

Further areas of applicability will become apparent from the description provided herein. The description and specific examples in this summary are intended for purposes of illustration only and are not intended to limit the scope of the present disclosure.

BRIEF DESCRIPTION OF THE DRAWING

The drawing described herein is for illustrative purposes only of a selected embodiment and not all possible implementations, and are not intended to limit the scope of the present disclosure, wherein the drawing is a schematic flow diagram of a fuel cell system having a combination valve for bleeding water and diluent gas from an anode to a cathode inlet.

DETAILED DESCRIPTION OF THE INVENTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. In respect to the methods disclosed, the order of the steps presented is exemplary in nature, and thus, the order of the steps can be different in various embodiments.

The present technology combines diluent gas purge and water drain functionalities on an anode side of a fuel cell into a single functionality that is routed to a cathode inlet, thereby minimizing hydrogen emissions. Combination of diluent gas purge and water drain minimizes a complexity and a cost of a fuel cell system and curtails hydrogen emissions. The combined diluent gas purge and water drain can also be routed to the cathode exhaust, but this may be less attractive for emission reasons. During operation of the fuel cell system, purging of diluent gas to maintain fuel gas purity can occur more frequently than liquid water drain events. This allows merging the functions of a diluent gas purge valve and water drain valve into a single combination valve. When a purge of diluent gas is requested, the combination valve opens, draining any water in a sump, after which the diluent gas is purged. An amount of accumulated water and diluent gas in the anode can be minimized as a result.

To add to emission robustness, the combination valve is routed to the cathode inlet of the fuel cell stack rather than a fuel cell outlet such as a cathode exhaust. This allows any hydrogen escaping through the combination valve to be fully or partially catalytically reacted with oxygen, forming water in the MEA and reducing exhaust emission issues. For instance, during the combined purge and drain operation, an amount of hydrogen can exit the combination valve. If too much hydrogen is allowed to pass, it could cause a hydrogen exhaust emissions issue if routed to a fuel cell outlet such as the cathode exhaust, for example. Routing the combination valve to the fuel cell cathode inlet instead consumes the hydrogen escaping through the combination valve once it reaches a cathode electrode, causing the cathode exhaust, and ultimately the fuel cell or fuel cell vehicle exhaust, to have a substantially reduced hydrogen content.

A controller can employ an anode bleed model using fuel injector feedback to determine the amount of anode gas vapor exiting the combination valve, and can request the valve to close once the required amount of diluent is purged. The model can determine if gas or liquid is exiting the valve, providing the correct purge duration to effectively remove liquid followed by the necessary amount of gas. In particular, the phase transition from liquid to gas through the combination bleed/drain valve in an anode recirculation system of a fuel cell system can be determined. The present technology can also be applied to fuel cell systems using other anode subsystems, including anode flow shifting systems.

The FIGURE is a schematic flow diagram of a fuel cell system 10 according to an embodiment of the present technology. The fuel cell system 10 includes a fuel cell stack 12 having a cathode side and an anode side. The fuel cell system 10 includes a compressor 14 that provides oxygen or air to the cathode side of the fuel cell stack 12 through a cathode input conduit 16, where cathode output gas is output from the fuel cell stack 12 through a cathode output conduit 18. The fuel cell system 10 also includes a hydrogen gas source 22 that provides hydrogen gas through an anode input conduit 24 that can be injected into the anode side of the fuel cell stack 12 by an injector 26. The injector 26 can be any injector, or a bank of injectors, suitable for the purposes described herein.

In the embodiment shown, the fuel cell system 10 employs anode recirculation where an anode recirculation gas output through an anode exhaust gas conduit 28 is recirculated back to the anode input conduit 24 by an anode recirculation conduit 30 through the injector 26 to conserve hydrogen gas that is discharged from the fuel cell stack 12. A pressure sensor 32 can measure a pressure in the anode output conduit 28.

As described herein, water is a byproduct of the operation of the fuel cell stack 12. In order to remove the water from the recirculated anode gas so it is not sent back to the anode input, a water separation device 34 is provided in the anode recirculation conduit 30. The water separation device 34 includes a reservoir or tank 36 that holds water collected by the water separator device 34 in a manner understood to those skilled in the art. A water level indicator 38 provides an indication of the water level in the reservoir 36 so that the system 10 can determine when to drain the reservoir 36. The water separation device 34 also includes a drain/purge combination valve 40 that can be located in a sump (not shown) at the bottom of the reservoir 36 that operates to both drain the reservoir 36 of water and purge diluent gas (e.g., nitrogen) from the recirculated anode gas. The drained water and purged gas is sent through conduit 42 to join the oxygen or air of the cathode input conduit 16 so that hydrogen present in the drain/purge is partially or completely consumed within the cathode side of the fuel cell. Conduit 42 may also include an anti-reverse valve (not shown). The drained water and purged gas sent through the conduit 42 may also be directed upstream of a humidifier (not shown) used to humidify the cathode input to the fuel cell stack 12.

A controller 44 can control operation of the injector 26 and the combination valve 40, and can receive signals from the water level indicator 38 in the water separation device 34 and from the pressure sensor 32 in the anode exhaust gas conduit 28. The controller 44 can be configured to detect a phase change from liquid to gas of a fluid passing through the valve 40. In this manner, the controller 44 can employ an anode bleed model for purging diluent gas once an amount of water is drained, if present.

An anode bleed model can calculate how much diluent gas (e.g., nitrogen) is in the anode side of the fuel cell stack 12 to determine when to perform an anode drain/purge through the combination valve 40. To provide an accurate determination of the nitrogen in the anode side of the fuel cell stack 12, the model needs to determine how much nitrogen or gas is being bled through the combination valve 40 for both a system water drain request and a system diluent gas purge request. When the combination valve 40 is opened for the drain/purge request, any water present can first flow through the valve 40, and at some point thereafter when the reservoir 36 is empty, gas will begin to flow through the valve 40. Typically, there is minimal two-phase flow through the valve 40 in that the transition from water flow to gas flow is well defined and abrupt. Once the model determines when the gas flow through the valve 40 starts, it can use various system parameters, such as valve orifice size, concentration of diluent gas (e.g., nitrogen), anode pressure, etc., to determine the amount of gas that is being removed from the anode side of the fuel cell stack 12.

In some embodiments, the water in the water separator device 34 acts as a pressure barrier in the valve 40 to determine when the water is completely drained from the reservoir 36 and gas begins to flow out of the valve 40. Particularly, when the valve 40 is opened and water is draining from the reservoir 36 through the valve 40, the pressure in the anode side of the stack 12 remains substantially constant as detected by the pressure sensor 32, where the duty cycle of the injector 26 remains substantially constant. However, when gas begins flowing through the valve 40, the pressure in the anode side of the fuel cell stack 12 drops and the duty cycle of the injector 26 increases in order to increase the pressure in the anode side and maintain the level of hydrogen necessary for the commanded current density for the fuel cell stack 12.

In some embodiments, the controller 44 is configured to employ an algorithm that obtains the flow rate through the anode flow system when the valve 40 is opened to determine that gas is flowing through the valve 40. For example, for a particular fuel cell stack current density when the valve 40 is open, a certain flow rate should be occurring, and that flow rate is determined by the duty cycle of the injector 26. When that flow rate is within a desired or predetermined threshold of the stored flow rate for the valve 40 being open, then the algorithm determines that gas is now flowing through the valve 40.

The analysis can be defined by the equation:

$$\left( \frac{i \cdot AA \cdot Ncell}{2 \cdot F} + \dot{n}_{bleed} + \frac{\frac{dp}{dt} \cdot V_{An}}{R \cdot T} \right) - \dot{n}_{inj} < \text{Tolerance}$$

where i is the current density of the fuel cell stack 12, AA is the active area of a fuel cell in the stack 12, $N_{cell}$ is the number of fuel cells in the stack 12, F is Faradays constant, $\dot{n}_{bleed}$ is the predicted gas flow through the valve 40, P is the pressure in the anode, $V_{An}$ is the volume of the anode subsystem, R is a gas constant, T is temperature, and $\dot{n}_{inj}$ is the injector flow rate.

The first term in the parenthesis in the equation ($i \cdot AA \cdot N_{cell}/2 \cdot F$) is a feed-forward term to tell the algorithm where to start and the third term in the parenthesis (($dp/dt) \cdot V_{An}/R \cdot T$) is a flow bias term. The feed-forward term, the flow bias term, and the predicted flow ($\dot{n}_{bleed}$) through the valve 40 are added to get an added flow value in the equation. The flow ($\dot{n}_{inj}$) through the injector 26 is subtracted from the added value and compared to a tolerance value. If the subtracted value is less than the tolerance value, meaning that the flow through the injector 26 has increased because of the pressure drop in the anode flow system, then the algorithm determines that gas is now flowing through the valve 40. The algorithm then uses that flow to adjust the diluent gas (e.g., nitrogen) concentration model in the stack 12. Although power transients typically do not have an effect on the above equation for determining the transition from water flow to gas flow, in some embodiments the flow bias term can be adjusted for up-transients to make the algorithm more accurate. Methods for detecting orifice flow phase transition in a pressure controlled anode can include those described in U.S. Pat. Appl. Pub. No. 2011/0207012 to Frost et al., which is incorporated herein by reference in its entirety.

In some embodiments, the fuel cell system can include split fuel cell stacks that employ flow-shifting, where the anode fuel gas flows back and forth through the split stacks. As such, the anode exhaust gas conduits can be purged as described in U.S. Pat. Appl. Pub. No. 2008/0311442 to Sienkowski et al, which is incorporated herein by reference in its entirety, where the purged gas is directed through a drain/purge combination valve to the cathode input conduit according to the present technology.

In some embodiments, the concentration or percentage of diluent gas (e.g., nitrogen) in the anode of the fuel cell stack 12 is determined in a proactive manner so that it can be bled through the valve 40 by the controller 44. For example, a nitrogen crossover model may be employed to determine the concentration of nitrogen in the anode side of the fuel cell stack 12, or split fuel stacks where more than one stack is present in the system. Any suitable nitrogen crossover model can be used for the purposes described herein, several of which are known in the art. Alternatively, a sensor can be provided within the anode input flow conduit to provide a measurement of the nitrogen in the anode side of the fuel cell stack 12 as long as it is robust enough for the wet fuel cell environment. A nitrogen bleed (i.e., diluent gas purge) command is determined proactively in this manner because the bleed is not commanded until the nitrogen concentration becomes too high. This method can trigger an anode bleed as long as the fuel cell stack performance is stable; i.e., the stack voltages remain stable and uniform. The nitrogen crossover model can include those described in U.S. Pat. Appl. Pub. No. 2011/0087441 to Salvador et al., which is incorporated herein by reference in its entirety.

Using a driver power request signal and the concentration of nitrogen from the nitrogen model or sensor measurement, the controller 44 can determine whether the concentration of nitrogen in the anode side of the fuel cell stack 12 is greater than a predetermined or desired threshold. If the concentration of nitrogen is above the predetermined threshold for a particular fuel cell stack 12 current density, then the controller 44 using the nitrogen crossover model can initiate a bleed request. Two other bleed triggers can be used, sometimes referred to as bounce and spread, which are characterized as reactive methods because they act as safeties when the fuel cell stack becomes unstable. These methods look directly at cell voltages to characterize stack performance and stability, as described in U.S. Pat. Appl. Pub. No. 2008/0311442 to Sienkowski et al.

Since the combination valve 40 effectively drains the water separation device 34 for every purge event, and diluent gas purge events can often be initiated more frequently than water drain events, the water separation device 34 need not include a liquid water sensor 38 in some embodiments of the present technology. Moreover, if there is ever an instance where a purge event does not happen in a specified amount of time, the controller 44 can be configured to request a drain at a predetermined time, ensuring the liquid water does not overwhelm the anode sump. The controller 44 can also be configured to conduct a drain/purge at particular times, such as before or after startup or shutdown of the fuel cell system.

The present technology provides a fuel cell system 10 having several benefits. There is a reduced cost due to removal of a dedicated purge valve and liquid water level sensor. The overall fuel cell system is simplified. Purging gas and draining liquid water into the cathode inlet of the fuel cell also minimizes the chance of hydrogen exhaust emissions due to catalytic combustion of the hydrogen gas once it enters the cathode side of the fuel cell.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A fuel cell system comprising:
   a fuel cell including a cathode inlet, a cathode outlet, an anode inlet, and an anode outlet, the anode inlet including an injector in fluid communication therewith;
   a water separation device fluidly coupled to the anode outlet and including a reservoir and a valve, the valve located at a bottom of the reservoir and fluidly coupled to the cathode inlet through a drain/purge conduit, the valve not fluidly coupled to the anode inlet, the water separation device fluidly coupled to the anode inlet through an anode recirculation conduit, wherein the anode recirculation conduit is distinct from the drain/purge conduit, wherein the anode recirculation conduit is not fluidly coupled to the anode outlet, and wherein the anode recirculation conduit is not fluidly coupled to the valve; and
   a controller configured to operate the valve and the injector.

2. The fuel cell system of claim 1, wherein the anode outlet and the anode recirculation conduit do not include a purge valve fluidly coupled to the cathode outlet.

3. The fuel cell system of claim 1, wherein the water separation device is not fluidly coupled to the cathode outlet.

4. The fuel cell system of claim 1, wherein the water separation device does not include a water level sensor.

5. The fuel cell system of claim 1, wherein the anode outlet or the anode recirculation conduit includes a pressure sensor and the controller is configured to receive signals from the pressure sensor.

6. The fuel cell system of claim 5, wherein the controller is configured to determine when a fluid passing through the valve transitions from liquid to gas.

7. The fuel cell system of claim 5, wherein the controller is configured to compare a first flow rate through the water separation device and a second flow rate through the injector to determine when the valve transitions from draining liquid to purging gas.

8. The fuel cell system of claim 1, wherein the controller is configured to open the valve at a predetermined time interval.

9. The fuel cell system of claim 1, wherein a fuel cell stack comprising a plurality of fuel cells comprises the fuel cell.

10. A method for bleeding an anode side of a fuel cell system comprising:
    providing a fuel cell system including:
      a fuel cell including a cathode inlet, a cathode outlet, an anode inlet including an injector, and an anode outlet;
      a water separation device fluidly coupled to the anode outlet and including a reservoir and a valve, the valve located at a bottom of the reservoir and fluidly coupled to the cathode inlet through a drain/purge conduit, the valve not fluidly coupled to the anode inlet, the water separation device fluidly coupled to the anode inlet through an anode recirculation conduit, wherein the anode recirculation conduit is distinct from the drain/purge conduit, wherein the anode recirculation conduit is not fluidly coupled to the anode outlet, and wherein the anode recirculation conduit is not fluidly coupled to the valve; and
      a controller configured to operate the valve and the injector;
    opening the valve using the controller to at least one of drain liquid and purge gas to the cathode inlet or the cathode outlet.

11. The method of claim 10, wherein the water separation device is not fluidly coupled to the cathode outlet.

12. The method of claim 10, wherein the water separation device does not include a water level sensor.

13. The method of claim 10, wherein the anode outlet includes a pressure sensor and the controller receives signals from the pressure sensor.

14. The method of claim 10, wherein the controller determines when a fluid passing through the valve transitions from liquid to gas.

15. The method of claim 10, wherein the controller compares a first flow rate through the water separation device and a second flow rate through the injector to determine when the valve transitions from draining liquid to purging gas.

16. The method of claim 10, wherein the controller opens the valve at a predetermined time interval.

17. The method of claim 10, wherein opening the valve using the controller drains liquid and purges gas to the cathode inlet.

* * * * *